United States Patent
Turicik et al.

(10) Patent No.: US 8,534,744 B2
(45) Date of Patent: Sep. 17, 2013

(54) PILLAR GARNISHMENTS, INTERIOR GARNISHMENT ASSEMBLIES INCORPORATING THE SAME, AND METHODS FOR CONTROLLING ALIGNMENT OF INTERIOR GARNISHMENT ASSEMBLIES

(75) Inventors: Louis William Turicik, Ann Arbor, MI (US); Kazuya Tsujimoto, Toyota (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 123 days.

(21) Appl. No.: 13/223,918

(22) Filed: Sep. 1, 2011

(65) Prior Publication Data

US 2013/0057009 A1 Mar. 7, 2013

(51) Int. Cl.
*B60J 10/08* (2006.01)

(52) U.S. Cl.
USPC ....... 296/146.9; 296/1.08; 296/39.1; 296/209

(58) Field of Classification Search
USPC ............... 49/475.1, 490.1; 296/1.08, 146.7, 296/146.9, 39.1, 193.06, 209; D12/195
See application file for complete search history.

(56) References Cited

U.S. PATENT DOCUMENTS

| | | | | |
|---|---|---|---|---|
| 3,078,116 A * | 2/1963 | West | ............. | 296/208 |
| 3,195,948 A * | 7/1965 | Sturtevant et al. | ............. | 296/214 |
| 3,622,195 A * | 11/1971 | Lautenbach | ............. | 296/35.1 |
| 5,072,546 A * | 12/1991 | Ogawa | ............. | 49/490.1 |
| 5,288,121 A * | 2/1994 | Graves | ............. | 296/146.9 |
| 5,613,327 A * | 3/1997 | Sauve | ............. | 49/490.1 |
| 5,866,232 A * | 2/1999 | Gatzmanga | ............. | 428/122 |
| 6,381,906 B1 * | 5/2002 | Pacella et al. | ............. | 49/502 |
| 6,641,204 B2 | 11/2003 | Ogawa et al. | | |
| 6,837,008 B2 | 1/2005 | Roberts et al. | | |
| 6,883,847 B2 | 4/2005 | Willett | | |
| 6,889,472 B2 | 5/2005 | Nozaki et al. | | |
| 6,935,072 B2 | 8/2005 | Kogiso et al. | | |
| 7,144,075 B2 * | 12/2006 | Shishikura | ............. | 296/209 |
| 7,210,730 B2 | 5/2007 | Fujita et al. | | |
| 7,264,306 B2 | 9/2007 | Nakao et al. | | |
| 7,686,386 B2 | 3/2010 | Marks et al. | | |
| 7,841,636 B2 * | 11/2010 | Huth et al. | ............. | 296/1.08 |
| 7,908,123 B2 | 3/2011 | Maebayashi et al. | | |
| 7,967,367 B2 | 6/2011 | Cafeo et al. | | |

(Continued)

FOREIGN PATENT DOCUMENTS

JP 03224872 A * 10/1991
JP 04297348 A * 10/1992

*Primary Examiner* — Glenn Dayoan
*Assistant Examiner* — Paul Chenevert
(74) *Attorney, Agent, or Firm* — Dinsmore & Shohl LLP

(57) ABSTRACT

In one embodiment, an interior garnishment assembly may include a pillar garnishment coupled to a vehicle pillar, a door opening trim engaged with the pillar garnishment and the vehicle pillar, and a scuff plate coupled to the pillar garnishment. The pillar garnishment may include a ledge portion that extends at least partially along a W direction, a datum orifice formed in a low end of the ledge portion, and a datum feature joined with the ledge portion. The datum feature can be substantially hook shaped. The door opening trim may include a biased member that can clamp the datum feature to the vehicle pillar along the W direction. The scuff plate may include an attachment member that can be engaged with the datum orifice of the pillar garnishment. The datum feature of the pillar garnishment can control alignment of the door opening trim and the scuff plate.

18 Claims, 6 Drawing Sheets

(56) References Cited

U.S. PATENT DOCUMENTS

| | | | |
|---|---|---|---|
| 8,262,154 B2 * | 9/2012 | Garnett et al. | 296/199 |
| 2003/0164624 A1 * | 9/2003 | Kohara et al. | 296/146.7 |
| 2005/0072053 A1 * | 4/2005 | Filipczak et al. | 49/490.1 |
| 2005/0246963 A1 | 11/2005 | Kogiso et al. | |
| 2007/0209286 A1 | 9/2007 | Nadano | |
| 2008/0000165 A1 | 1/2008 | Ochiai | |
| 2008/0296928 A1 * | 12/2008 | Matsuoka et al. | 296/146.7 |
| 2009/0223135 A1 | 9/2009 | Bocutto | |
| 2009/0295011 A1 | 12/2009 | Smith et al. | |
| 2011/0215612 A1 * | 9/2011 | Maertin et al. | 296/146.7 |
| 2012/0161460 A1 * | 6/2012 | Nakazawa et al. | 296/1.08 |

* cited by examiner

PILLAR GARNISHMENTS, INTERIOR GARNISHMENT ASSEMBLIES INCORPORATING THE SAME, AND METHODS FOR CONTROLLING ALIGNMENT OF INTERIOR GARNISHMENT ASSEMBLIES

TECHNICAL FIELD

The present specification generally relates to pillar garnishments, interior garnishment assemblies for controlled alignment and methods for controlling alignment of interior garnishment assemblies.

BACKGROUND

Manufacturers generally seek to assemble components in a repeatable manner that reduces variance from nominal design specifications. When components are assembled with a relatively small variance from nominal design specification, the overall performance and robustness of the assembled product may be enhanced. Additionally, the aesthetics of components may be enhanced by controlling and or reducing variance. Accordingly, it is believed that a decrease in variance is correlated with quality.

For example, automobile interiors may include assemblies of moldings, panels, and other components having a variety of shapes and materials. The relative spacing of the components of the interior assembly with respect to one another may, as noted above, impact consumer perception of overall vehicle quality. When the components are assembled, the relative spacing may be dependent upon the variance of each of the components of the overall interior assembly. Moreover, each individual variance can contribute to a dimensional tolerance "stack-up" of the assembly that may control the relative spacing of any individual component of the interior assembly. Thus, the relative spacing of any individual component may be difficult to control due to the dimensional tolerance "stack up."

Accordingly, a need exists for alternative pillar garnishments, interior garnishment assemblies and methods for controlling alignment of interior garnishment assemblies.

SUMMARY

In one embodiment, an interior garnishment assembly may include a pillar garnishment coupled to a vehicle pillar, a door opening trim engaged with the pillar garnishment and the vehicle pillar, and a scuff plate coupled to the pillar garnishment. The pillar garnishment may include a ledge portion that extends at least partially along a W direction, a datum orifice formed in a low end of the ledge portion, and a datum feature joined with the ledge portion. The datum feature can be substantially hook shaped. The door opening trim may include a biased member that can clamp the datum feature to the vehicle pillar along the W direction and can align the datum orifice of the pillar garnishment to the vehicle pillar along the W direction. The scuff plate may include an attachment member that can be engaged with the datum orifice of the pillar garnishment. The datum feature of the pillar garnishment can control alignment of the door opening trim and the scuff plate along the W direction.

In another embodiment, a method for controlling alignment of an interior garnishment assembly may include coupling a pillar garnishment to a vehicle pillar. The pillar garnishment may include a ledge portion that extends at least partially along a W direction, a datum orifice formed in a low end of the ledge portion, and a datum feature that is substantially hook shaped and joined with the ledge portion. The vehicle pillar can be clamped with a biased member of a door opening trim. The biased member of the door opening trim can clamp the vehicle pillar along a W direction. The datum feature can be clamped to the vehicle pillar with the biased member of the door opening trim. The biased member can clamp the datum feature to the vehicle pillar along the W direction and can align the datum orifice to the vehicle pillar along the W direction. The attachment member of a scuff plate can be engaged with the datum orifice of the pillar garnishment. The datum feature of the pillar garnishment can control alignment of the door opening trim and the scuff plate along the W direction.

In yet another embodiment, a pillar garnishment may include a vertical portion, a ledge portion, a datum orifice, and a datum feature. The vertical portion may at least partially obscure a vehicle pillar. The ledge portion can be joined with the vertical portion and can extend from the vertical portion at least partially along a W direction. The datum orifice for receiving a scuff plate can be formed in a low end of the ledge portion. The datum feature can be joined with the ledge portion. The datum feature may include a ledge projection that extends downward from the ledge portion and a clamping projection joined with the ledge projection that extends upward from the ledge projection of the datum feature. The clamping projection and the ledge projection can be aligned at a datum alignment angle α. The datum alignment angle α can be acute. When the datum feature is engaged with the vehicle pillar, the datum feature can align the datum orifice of the scuff engagement feature to the vehicle pillar along the W direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 2:
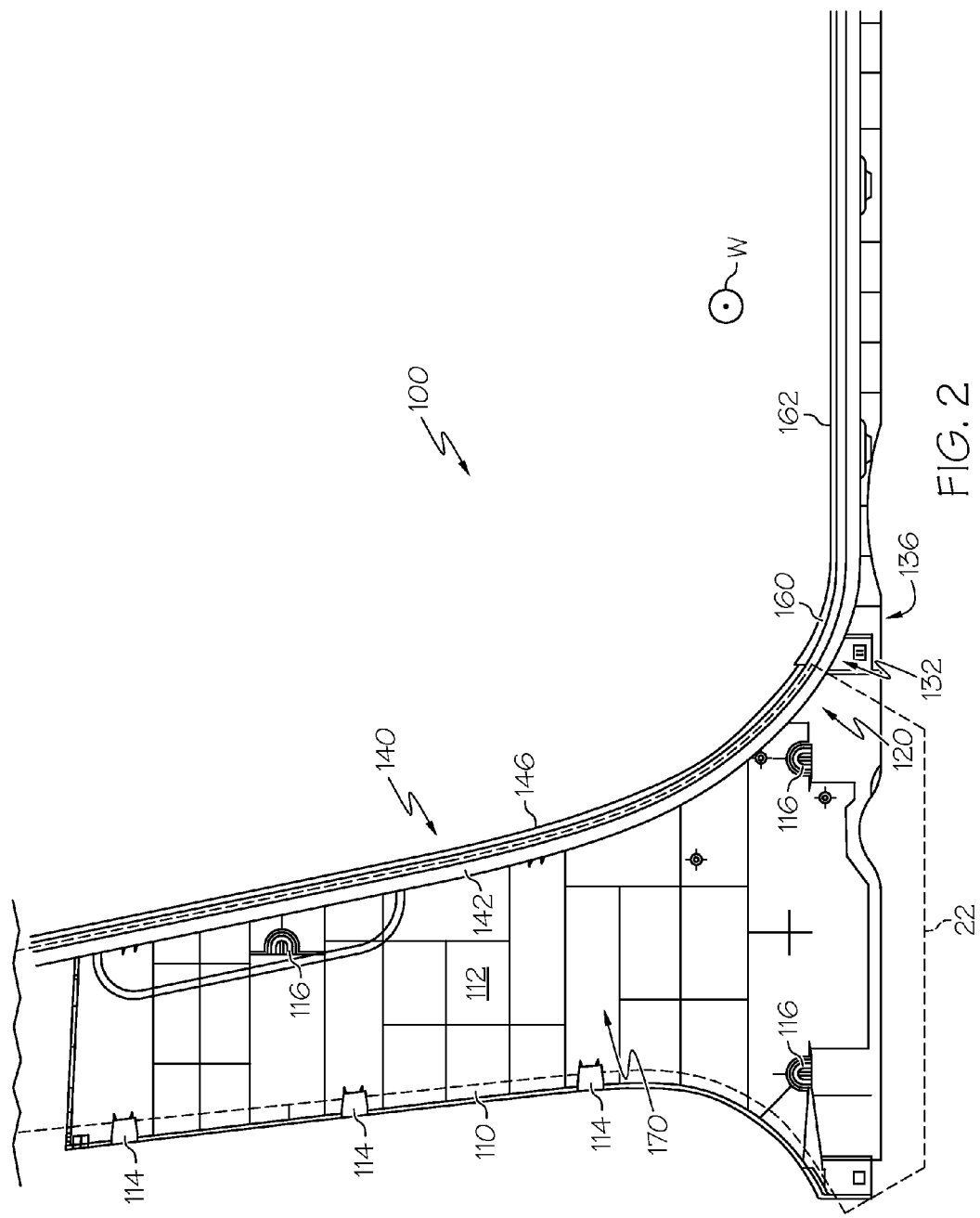
FIG. 2 schematically depicts an interior garnishment assembly according to one or more embodiments shown and described herein.

FIG. 2 generally depicts one embodiment of an interior garnishment assembly for providing a decorative cover for a vehicle body component (e.g., pillar). The interior garnishment assembly generally comprises a pillar garnishment for covering a vehicle pillar, a door opening trim for sealing a vehicle door, and a scuff plate that covers a portion of the vehicle interior. Various embodiments of the interior garnishment assembly and methods for controlling alignment of interior garnishment assemblies will be described in more detail herein.

Figure 1:
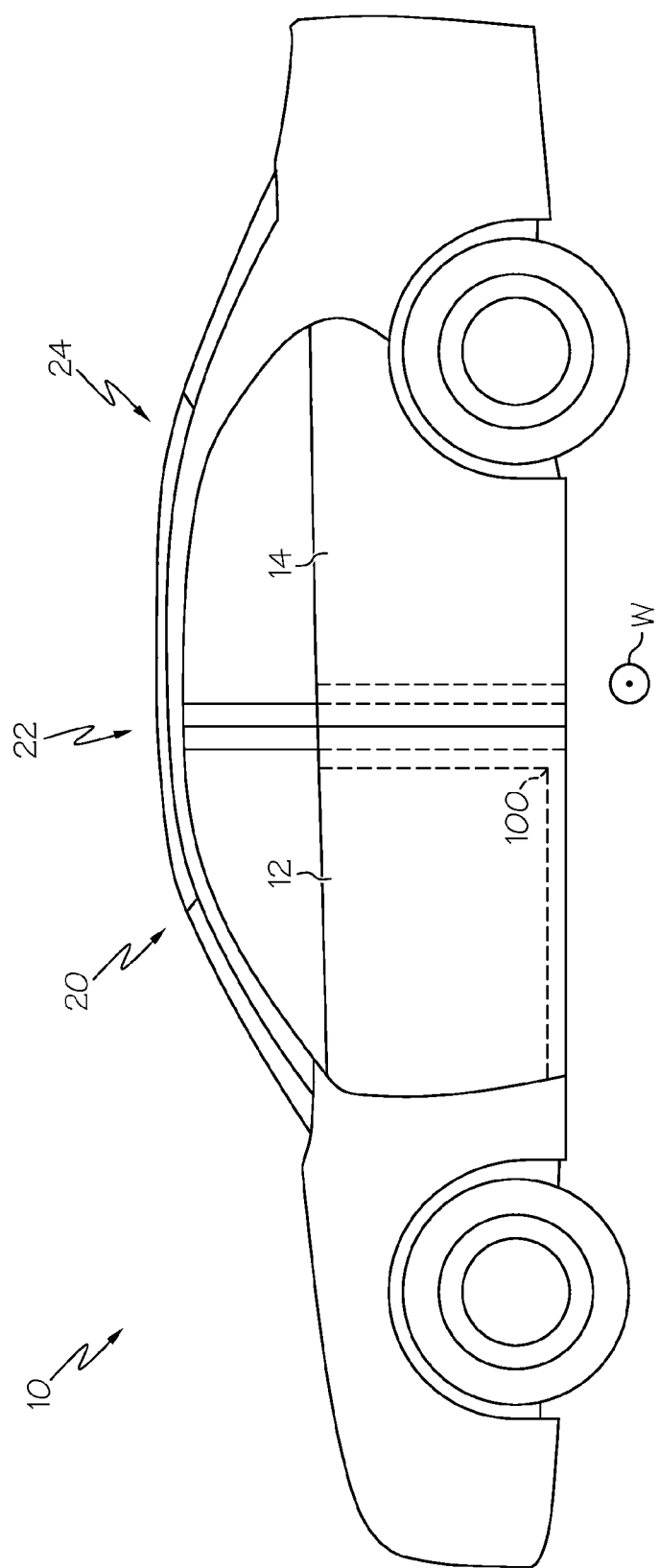
FIG. 1 schematically depicts a vehicle according to one or more embodiments shown and described herein.

Referring now to FIG. 1, a vehicle 10 such as an automobile is schematically depicted. The vehicle 10 may comprise a plurality of substantially vertical supports surrounding a front door 12 and a back door 14. Specifically, the vehicle 10 may comprise an A-pillar 20, a B-pillar 22 and a C-pillar 24, which act as vertical supports for the vehicle. The front door 12 can be located between and operably coupled to the A-pillar 20 and the B-pillar 22. Similarly, the back door 14 can be located between and operably coupled to the B-pillar 22 and the C-pillar 24. Generally, the shape of the vehicle 10 may be influenced by altering the orientation, shape, and number of vertical supports. Accordingly, it is noted that, while the vehicle 10 is depicted in FIG. 1 as a sedan, the vehicle 10 may be a coupe, a wagon, a hatchback, a truck, or any other mode of transport having a vertical support.

The B-pillar 22 can be formed from multiple sheet metal (e.g., steel) layers. The B-pillar 22 may include attachment features such as holes or slots for receiving fasteners such as clips. Each of the sheet metal layers of the B-pillar 22 may be formed into a desired shape having the desired features by cutting, punching, stamping, bending, or any other known sheet metal manufacturing process. Once formed each of the sheet metal layers may be attached to one another to form the desired structure. For example, the B-pillar 22 can be formed from multiple sheet metal layers that are welded together. Accordingly, the final assembled shape of the B-pillar 22 may be influenced by variations in the weld dimension during the manufacture of the B-pillar 22. Moreover, any welded structure of the vehicle 10 may include similar dimensional variances influenced by the welding process or any other manufacturing process. Accordingly, it is noted that, while particular embodiments are described herein with reference to the B-pillar 22, the embodiments described herein may be utilized with other structures such as, but not limited to, the A-pillar 20, the C-pillar 24, or a D-pillar (not depicted in FIG. 1).

Figure 3:
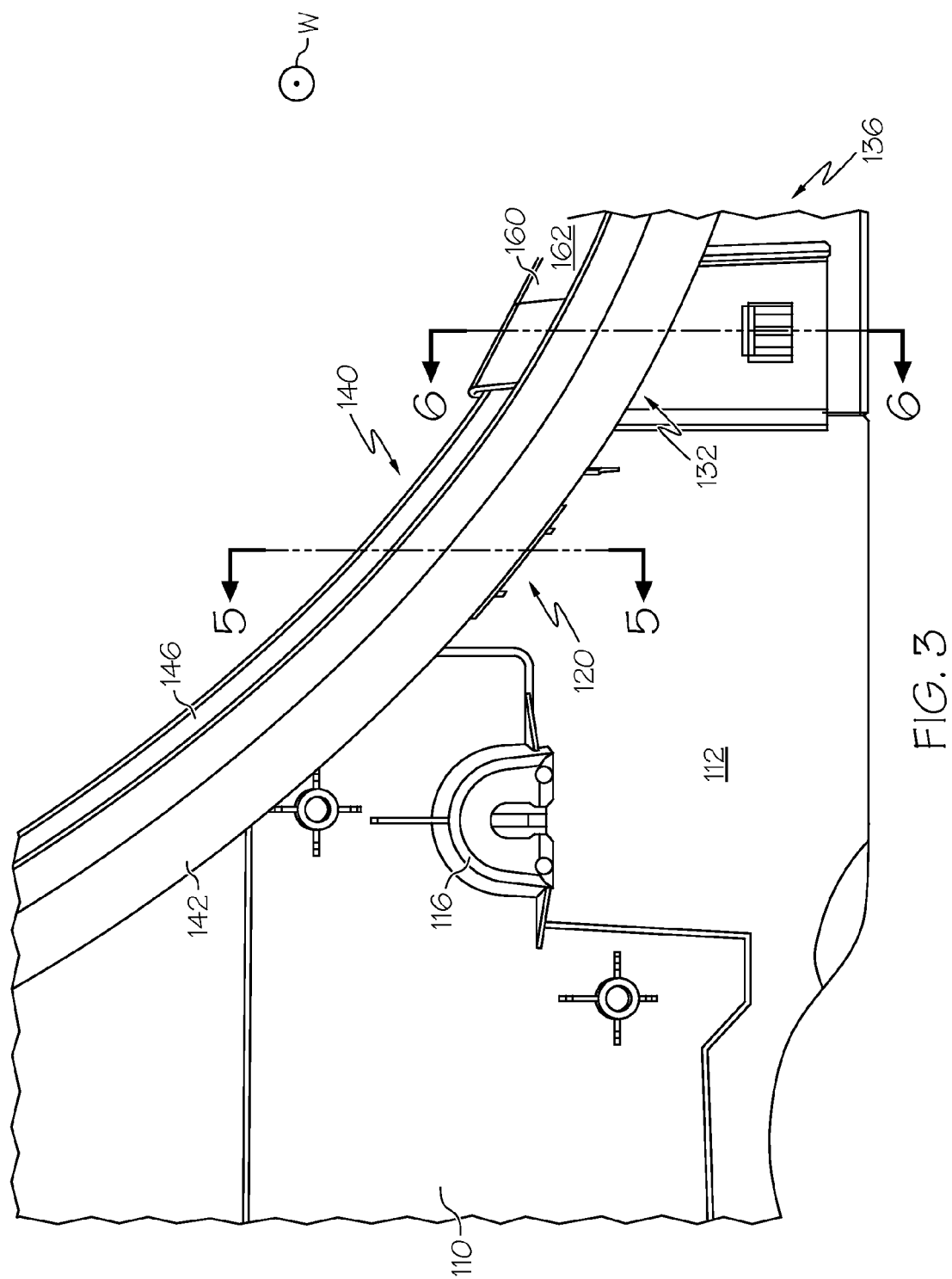
FIG. 3 schematically depicts an interior garnishment assembly according to one or more embodiments shown and described herein.

Referring collectively to FIGS. 2 and 3, an interior garnishment assembly 100 may be coupled to the B-pillar 22 (FIG. 2) of the vehicle 10 to provide pleasing interior aesthetics and to mitigate the infiltration of exterior noise into the interior of the vehicle 10. The interior garnishment assembly 100 can comprise a pillar garnishment 110, a door opening trim 140 and a scuff plate 160 aligned with one another.

Figure 4:
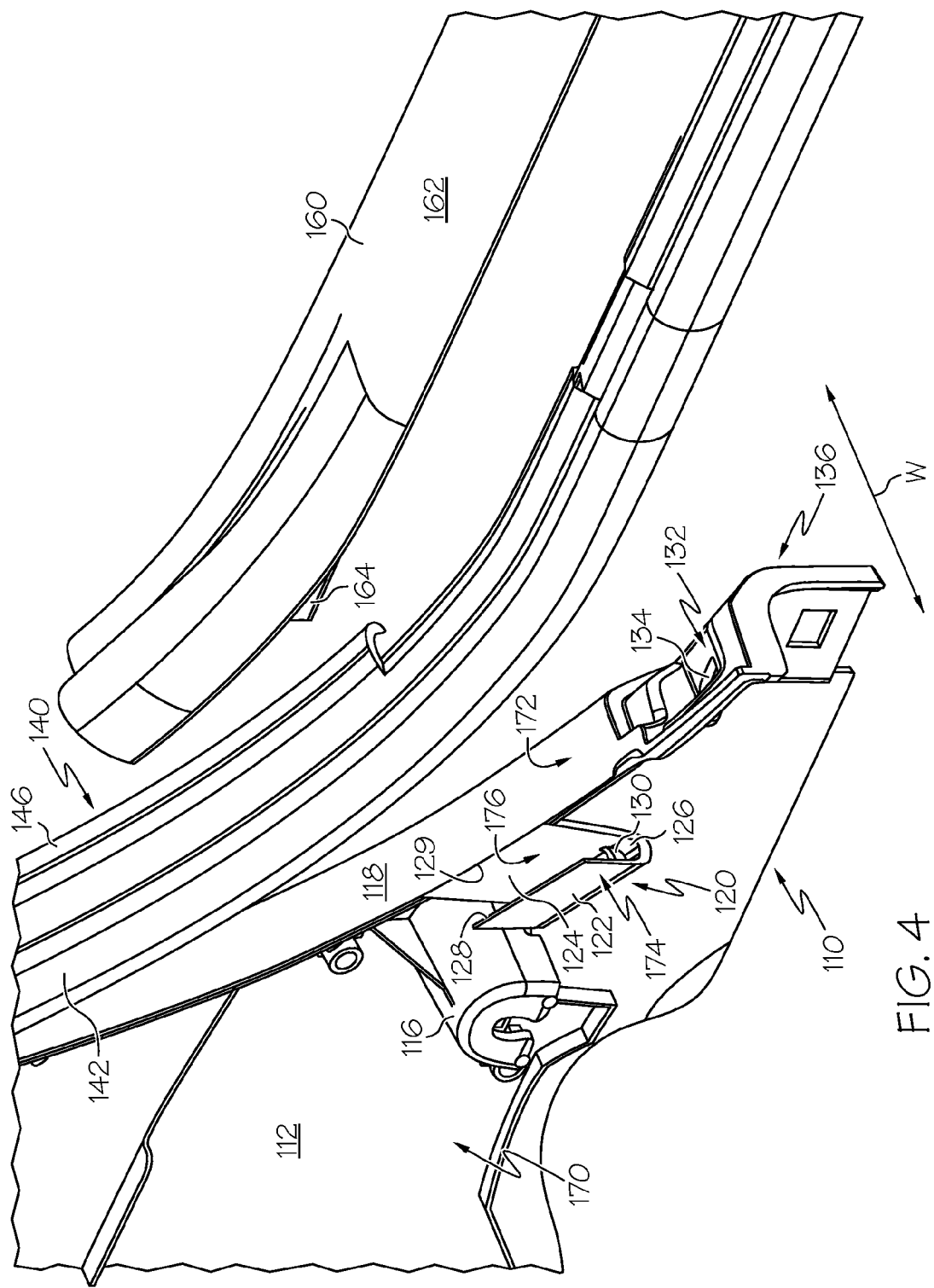
FIG. 4 schematically depicts an exploded view of an interior garnishment assembly according to one or more embodiments shown and described herein.

Referring now to FIG. 4, a pillar garnishment 110 for at least partially obscuring a B-pillar 22 from view may include a vertical portion 170 and a ledge portion 172 joined with the vertical portion 170. The vertical portion 170 can be shaped to substantially match the B-pillar 22. The ledge portion 172 can extend from the vertical portion 170 along the W direction. The pillar garnishment 110 may be formed from an injection molded polymer such as, for example, thermoplastics, thermosets, elastomers, and the like. The pillar garnishment 110 may comprise a finish surface 118 that faces the interior of a vehicle, when the pillar garnishment 110 obscures the B-pillar 22. Accordingly, the finish surface 118 may include embossing and/or embellishments that can be included during the molding process to improve the aesthetics of the vehicle interior.

The vertical portion 170 and the ledge portion 172 may form a partial enclosure that is configured to be coupled to the B-pillar 22. Specifically, a pillar facing surface 112 may be integral with the pillar garnishment 110 and follow the contour defined by the vertical portion 170 and a ledge portion 172 of the pillar garnishment 110. The pillar facing surface 112 may include attachment features for coupling to the B-pillar 22. For example, the pillar facing surface 112 may include sliding clip attachments 114, clip towers 116 or both. The sliding clip attachments 114 may be substantially planar structures offset from the pillar facing surface 112. The sliding clip attachments 114 can be configured to slidingly engage with a sliding clip that clamps the pillar garnishment 110 to the B-pillar 22. The clip towers 116 may be configured to engage with push clips (not depicted) that include a plurality of biased members. The biased members of the push clips may be inserted into corresponding holes on the B-pillar 22 and deflect inward to allow the push clip to travel into the corresponding hole. Once inserted, the biased members may return outwards and engage the portion of the B-pillar 22 surrounding the corresponding hole. Although sliding clips and push clips are described herein, it is noted that any suitable fastener (e.g., automotive fasteners) may be utilized to couple the pillar garnishment 110 to the B-pillar 22. Moreover, it is noted that the fasteners described herein may be separate from or integral with the B-pillar 22 or the pillar garnishment 110.

Referring collectively to FIGS. 2-4, the pillar garnishment 110 may comprise a datum feature 120 for controlling the alignment of the door opening trim 140 and the scuff plate 160 along the W direction. The datum feature 120 may comprise a pillar engagement surface 122 for contacting the B-pillar 22 (FIG. 2) and a trim engagement surface 124 for engaging the door opening trim 140. It is noted that, while the pillar engagement surface 122 is depicted in FIG. 4 as being substantially flat along the clamping projection 174, the pillar engagement surface 122 may comprise any contour configured to mate with B-pillar 22. Accordingly, the B-pillar 22 may include a corresponding feature to mate with the pillar engagement surface 122 of the datum feature 120.

Referring now to FIG. 4, the datum feature 120 may comprise a ledge projection 176 for joining the datum feature 120 to the ledge portion 172 of the pillar garnishment 110. Specifically, the ledge projection 176 may extend downward from the attached end 129 of the ledge projection 176 and the ledge portion 172 of the pillar garnishment 110. The datum feature 120 may further comprise a clamping projection 174 that sets a datum along the W direction. The clamping projection 174 may be joined with the ledge projection 176 of the datum feature 120. The clamping projection 174 can extend upward from the ledge projection 176 of the datum feature 120. For example, the datum feature 120 may be substantially hook shaped. Specifically, the clamping projection 174 and the ledge projection 176 may join and define a radius portion 126 of the datum feature 120.

Accordingly, a hook shape may be formed by the pillar engagement surface 122 and/or the trim engagement surface 124 of the datum feature 120 starting at the attached end 129 extending down along the ledge projection 176, changing direction along the radius portion 126, and extending upwards along the clamping projection 174 to the open end 128. In one embodiment, the ledge projection 176 can be larger than the clamping projection 174, i.e., the distance from the radius portion 126 to the attached end 129 is longer than the distance from the radius portion 126 to the open end 128. Alternatively, the open end 128 can be lower vertically than the attached end 129. In some embodiments, the datum feature 120 may comprise a cleat member 130 for engaging and limiting sliding of the door opening trim 140. Accordingly, the cleat member 130 can be pointed or any other shape suitable to engage the door opening trim.

Figure 5:
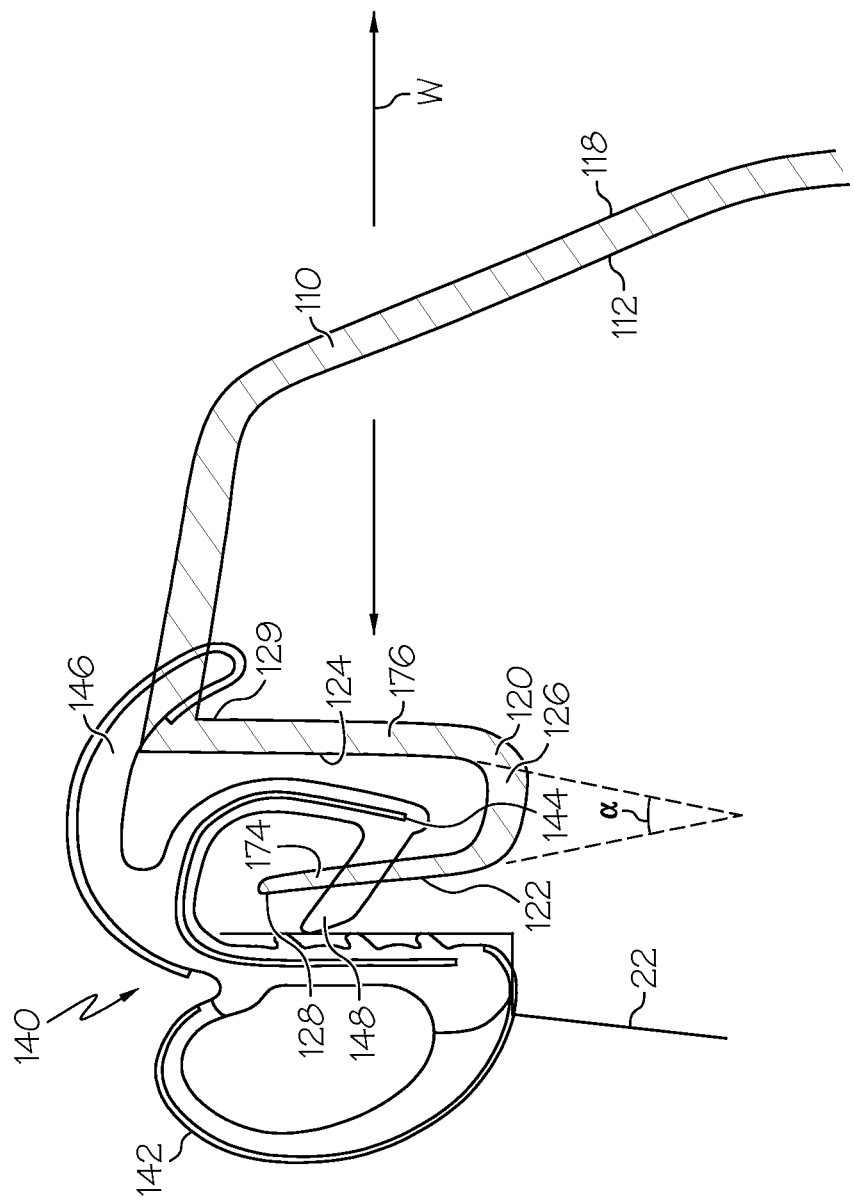
FIG. 5 schematically depicts a cross section of the interior garnishment assembly depicted in FIG. 3 according to one or more embodiments shown and described herein.

Referring now to FIG. 5, the shape of the datum feature 120 may be defined by the orientation of the clamping projection 174 with respect to the ledge projection 176. For example, the clamping projection 174 and the ledge projection 176 can be aligned at a datum alignment angle α, as measured from the pillar engagement surface 122 at the clamping projection and the trim engagement surface 124 at the ledge projection 176. The datum alignment angle α can be acute such as, for example, from about 5° to about 45°, about 10° to about 25°, or about 13°. Additionally, it is noted that, while the datum feature 120 is depicted in FIG. 5 as being substantially hook shaped or substantially "J" shaped, the datum feature 120 may be any shape suitable to properly align the clamping projection 174 and the ledge projection 176 such as, for example, substantially wedge shaped, substantially "U" shaped or substantially "V" shaped.

Figure 6:
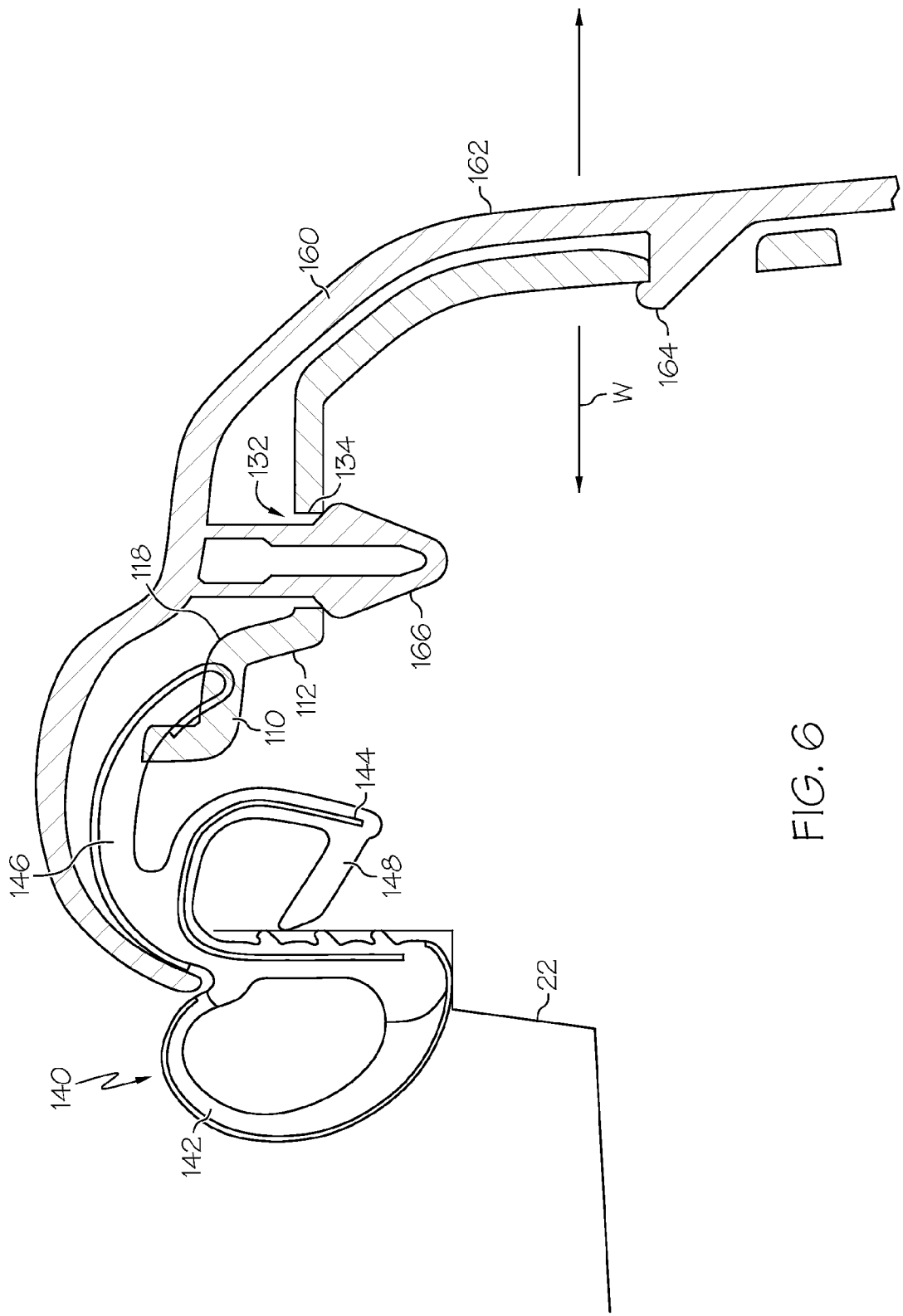
FIG. 6 schematically depicts a cross section of the interior garnishment assembly depicted in FIG. 3 according to one or more embodiments shown and described herein.

Referring collectively to FIGS. 4 and 6, the pillar garnishment 110 may comprise a scuff engagement feature 132 for joining the pillar garnishment 110 to the scuff plate 160. The scuff engagement feature 132 may be a recessed region formed in the ledge portion 172 at the low end 136 of the pillar garnishment 110. The scuff engagement feature 132 may comprise a datum orifice 134 for receiving a fastening member. The datum orifice 134 may be a hole formed through the ledge portion 172 of the pillar garnishment 110. In some embodiments, the pillar garnishment 110 may be substantially rigid. Accordingly, when the datum feature 120 of the pillar garnishment 110 is clamped to the B-pillar 22 (FIG. 2), the datum orifice 134 may be aligned to the B-pillar 22 (FIG. 2) by the datum feature 120 such as, for example, along the W direction.

Referring collectively to FIGS. 5 and 6, the embodiments described herein may comprise door opening trim 140 for sealing a door opening and abutting the pillar garnishment 110 and the scuff plate 160. The door opening trim 140 may be formed from a flexible material such as, for example, rubber or any other elastic material. The door opening trim 140 may comprise a hollow sealing member 142 for conforming to a portion of a closed door to form a seal between the door and the vehicle body. The hollow sealing member 142 can be substantially cylindrically shaped member surrounding a void.

The door opening trim 140 may comprise a biased member 144 for attaching the door opening trim 140 to the B-pillar 22 and/or the datum feature 120 of the pillar garnishment 110. The biased member 144 may have a substantially "U" shaped cross section and may be configured to hold the door opening trim 140 in place through the application of inward force, i.e., clamp objects within the door opening trim 140. The biased member 144 may include an embedded elastic (e.g., tension spring) member that increases the amount of inward force that can be applied by the biased member 144.

The door opening trim 140 may further comprise a covering member 146 for overlapping discontinuities and a holding member 148 for securing objects within the biased member 144. In one embodiment, the hollow sealing member 142 can be joined to the biased member 144. The covering member 146 may be joined to the biased member 144 and extend vertically and along the W direction away from the upper portion of the biased member 144. The holding member 148 may extend from the lower portion of the biased member 144 to substantially close the "U" shaped opening of the biased member. Accordingly, the door opening trim 140 can hold objects of various thicknesses with elastic force. Specifically, a relatively large amount of force can be applied by the door opening trim 140 to relatively large objects held by the door opening trim 140 and a relatively small amount of force can be applied by the door opening trim 140 relatively small objects held by the door opening trim 140.

Referring to FIG. 6, the scuff plate 160 may comprise a finish surface 162 for covering at least a portion the pillar garnishment 110 and the door opening trim 140 and an attachment surface 164 for mating with the pillar garnishment 110. The scuff plate 160 may be formed from any rigid material suitable for use as a floor covering in a vehicle such as, for example, a metal or a polymer. The finish surface 162 may include embossing and/or embellishments to improve the aesthetics of the vehicle interior. Additionally, the scuff plate 160 may comprise an attachment member 166 that is configured to engage with the datum orifice 134 of the pillar garnishment 110. The attachment member 166 can be coupled to the attachment surface 164 of the scuff plate 160. It is noted that, while the attachment member 166 is depicted in FIG. 6 as a push clip integral with the scuff plate 160, the attachment member 166 may be any fastener suitable for coupling with the datum orifice 134 and may be separate from or integral with scuff plate 160.

Referring back to FIG. 2, the interior garnishment assembly 100 may be manufactured by uniting the B-pillar 22, the pillar garnishment 110, the door opening trim 140 and the scuff plate 160. For example, the B-pillar 22 may be formed by welding layers of sheet metal with one another and providing attachment features for clips. The pillar garnishment 110 can be coupled to the B-pillar 22. For example, the appropriate clips can be placed in the sliding clip attachment 114 and the clip tower 116 of the pillar garnishment 110. Once the clips are coupled to the pillar garnishment 110, the pillar garnishment 110 may be coupled to the B-pillar 22 by fastening the clips to the corresponding mounting feature of the B-pillar 22. Alternatively, the clips may be coupled to the B-pillar 22 prior to coupling the pillar garnishment 110 to the B-pillar 22.

Again referring to FIG. 6, the door opening trim 140 can be coupled to the B-pillar 22. Specifically, the biased member 144 of a door opening trim 140 can be urged over an edge of the B-pillar 22. The door opening trim 140 can be clamped to the B-pillar 22 by the inwardly directed force of the biased member 144 and the holding member 148. Accordingly, the elastic energy of the door opening trim 140 can clamp the B-pillar 22 along the W direction.

Again referring to FIG. 5, it is noted that for clarity the door opening trim 140 is depicted in a biased position, i.e., when assembled, the pillar garnishment 110 deflects the biased member 144, the covering member 146 and the holding member 148 of the door opening trim 140 from the biased position to an assembled position. The door opening trim 140 can be coupled to the B-pillar 22 and the pillar garnishment 110. Specifically, the biased member 144 of a door opening trim 140 can be urged over an edge of the B-pillar 22 and over the clamping projection 174 of the datum feature 120 of the pillar garnishment 110. The datum feature 120 can be clamped in place by the inwardly directed force of the biased member 144 and the holding member 148. Specifically, the pillar engagement surface 122 of the clamping projection can be forced into contact with the B-pillar 22 by the elastic energy stored in the biased member 144 and/or the holding member 148. Accordingly, the elastic energy of the door opening trim 140 can clamp the datum feature 120 of the pillar garnishment 110 to the B-pillar 22 along the W direction.

Referring back to FIG. 6, the scuff plate 160 may be placed into contact with the pillar garnishment 110 and the door opening trim 140 to conceal gaps. Specifically, the attachment member 166 of the scuff plate 160 can be engaged with the datum orifice 134 of the pillar garnishment 110. When so engaged, the datum orifice 134 of the pillar garnishment 110 and the attachment member 166 can constrain the motion of the scuff plate 160 both laterally and vertically. Accordingly, the location of the datum orifice 134 within the scuff engagement feature 132 may control the alignment of the scuff plate along the W direction. Additionally it is noted that, while the door opening trim 140 is depicted in FIG. 6, in a biased position for clarity, the pillar garnishment 110 may deflect the covering member 146 upwards towards the scuff plate 160 when the pillar garnishment 110, the door opening trim 140 and the scuff plate are assembled.

Referring to FIG. 2, an embodiment of the interior garnishment assembly 100 is depicted after the B-pillar 22, the pillar garnishment 110, the door opening trim 140 and the scuff plate 160 have been coupled to one another. As is noted above, the pillar garnishment 110 may comprise substantially rigid material that limits the distortion of the pillar garnishment 110 during and/or after assembly to a vehicle. Accordingly, the datum feature 120 and the scuff engagement feature 132 and the datum orifice 134 (FIGS. 4 and 6) can remain substantially fixed along the W direction with respect to one another. Accordingly, when the datum feature 120 of the pillar garnishment 110 is clamped to the B-pillar 22, the datum feature 120 can align the datum orifice 134 (FIGS. 4 and 6) to the B-pillar along the W direction. Moreover, when the datum feature 120 of the pillar garnishment 110 is clamped the B-pillar 22 by the door opening trim 140, the datum feature 120 of the pillar garnishment 110 can control the alignment of the door opening trim 140 along the W direction. If the scuff plate 160 is also coupled to the datum orifice 134 (FIGS. 4 and 6), the datum feature 120 of the pillar garnishment 110 can control the alignment of the door opening trim 140 and the scuff plate 160 along the W direction.

It should now be understood that the datum feature of the pillar garnishment may control the assembled position of the components of the interior garnishment assembly. Moreover, by placing the datum feature in alignment with a pillar of a vehicle, the impact of dimensional variations of the pillar may be mitigated. For example, variations in the dimensions of the pillar (e.g., due to variations in welds, metal thickness, and the like) may contribute to the tolerance "stack up" and may affect the relative alignment of the components of the interior assembly. In the embodiments described herein, the datum feature can align the pillar garnishment, the door opening trim and the scuff plate to the pillar. Accordingly, instead of altering the positioning of individual components of the interior garnishment assembly, the entire interior garnishment assembly can be repositioned by variations in the dimensions of the pillar. Thus, the datum feature can operate to effectively remove the pillar from the tolerance "stack-up" of the interior garnishment assembly.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A pillar garnishment comprising:
   a vertical portion for at least partially obscuring a vehicle pillar;
   a ledge portion joined with the vertical portion and extending from the vertical portion at least partially along a transverse W direction;
   a scuff engagement feature formed in a low end of the ledge portion, the scuff engagement feature comprising a datum orifice for receiving a scuff plate;
   a datum feature joined with the ledge portion, the datum feature comprising a ledge projection that extends downward from the ledge portion and a clamping projection joined with the ledge projection that extends upward from the ledge projection of the datum feature, wherein:
   the clamping projection and the ledge projection are aligned at a datum alignment angle α;
   the datum alignment angle a is acute; and
   when the datum feature is engaged with the vehicle pillar, the datum feature aligns the datum orifice of the scuff engagement feature to the vehicle pillar along the W direction.

2. The pillar garnishment of claim 1, wherein the pillar garnishment is formed from an injection molded polymer.

3. The pillar garnishment of claim 1, wherein the pillar garnishment is coupled to the vehicle pillar with one or more clips.

4. The pillar garnishment of claim 1, wherein the clamping projection comprises a substantially flat surface for clamping to the vehicle pillar.

5. The pillar garnishment of claim 1, wherein the ledge projection is larger than the clamping projection.

6. The pillar garnishment of claim 1, wherein the datum feature comprises a cleat member.

7. An interior garnishment assembly comprising a pillar garnishment coupled to a vehicle pillar, a door opening trim engaged with the pillar garnishment and the vehicle pillar, and a scuff plate coupled to the pillar garnishment, wherein:
   the pillar garnishment comprises a ledge portion that extends at least partially along a transverse W direction, a datum orifice formed in a low end of the ledge portion, and a datum feature joined with the ledge portion;
   the datum feature is substantially hook shaped;
   the door opening trim comprises a biased member that clamps the datum feature to the vehicle pillar along the W direction and aligns the datum orifice of the pillar garnishment to the vehicle pillar along the W direction;
   the scuff plate comprises an attachment member that is engaged with the datum orifice of the pillar garnishment; and
   the datum feature of the pillar garnishment controls alignment of the door opening trim and the scuff plate along the W direction;
   wherein the datum feature comprises a ledge projection that extends downward from the ledge portion and a clamping projection joined with the ledge projection that extends upward from the ledge projection of the datum feature.

8. The interior garnishment assembly of claim 7, wherein the clamping projection and the ledge projection are aligned at a datum alignment angle a and the datum alignment angle α is acute.

9. The interior garnishment assembly of claim 7, wherein the pillar garnishment is coupled to the vehicle pillar with one or more clips.

10. The interior garnishment assembly of claim 7, wherein the vehicle pillar is a B-pillar.

11. The interior garnishment assembly of claim 7, wherein the pillar garnishment is formed from an injection molded polymer.

12. The interior garnishment assembly of claim 7, wherein the datum feature of the pillar garnishment comprises a cleat member engaged with the door opening trim.

13. The interior garnishment assembly of claim 7, wherein the biased member of the door opening trim is substantially "U" shaped.

14. The interior garnishment assembly of claim 7, wherein the clamping projection comprises a substantially flat surface.

15. The interior garnishment assembly of claim 14, wherein the substantially flat surface is forced into contact with the vehicle pillar by the biased member.

16. A method for controlling alignment of an interior garnishment assembly comprising:

coupling a pillar garnishment to a vehicle pillar, wherein the pillar garnishment comprises a ledge portion that extends at least partially along a transverse W direction, a datum orifice formed in a low end of the ledge portion, and a datum feature that is substantially hook shaped and joined with the ledge portion;

clamping the vehicle pillar with a biased member of a door opening trim, wherein the biased member of the door opening trim clamps the vehicle pillar along the W direction;

clamping the datum feature to the vehicle pillar with the biased member of the door opening trim, wherein the biased member clamps the datum feature to the vehicle pillar along the W direction and aligns the datum orifice to the vehicle pillar along the W direction; and engaging an attachment member of a scuff plate with the datum orifice of the pillar garnishment, wherein the datum feature of the pillar garnishment controls alignment of the door opening trim and the scuff plate along the W direction;

wherein the datum feature of the pillar garnishment comprises a ledge projection that extends downward from the ledge portion and a clamping projection joined with the ledge projection that extends upward from the ledge projection of the datum feature.

17. The method of claim 16, further comprising welding the vehicle pillar.

18. The method of claim 16, wherein the vehicle pillar is a B-pillar.

* * * * *